United States Patent [19]

Otto

[11] 4,070,282
[45] Jan. 24, 1978

[54] METHOD OF REMOVING DISSOLVED ORGANO-LEAD COMPOUNDS FROM WATER

[75] Inventor: Jack M. Otto, Beaumont, Tex.

[73] Assignee: PPG Industries, Inc., Pittsburgh, Pa.

[21] Appl. No.: 737,870

[22] Filed: Nov. 1, 1976

Related U.S. Application Data

[63] Continuation-in-part of Ser. No. 568,357, April 15, 1975, abandoned.

[51] Int. Cl.² ............................................. B01D 15/00
[52] U.S. Cl. ....................................... 210/27; 210/28; 210/38 B; 210/40
[58] Field of Search .................... 208/251 R, 299, 304; 210/24, 27, 28, 37 B, 38 B, 39, 40, 33; 260/437 R; 423/89

[56] References Cited

U.S. PATENT DOCUMENTS

| | | | |
|---|---|---|---|
| 2,392,846 | 1/1946 | Friedman | 208/253 |
| 3,244,621 | 4/1966 | Bouthilet | 210/39 |
| 3,436,344 | 4/1969 | Canning et al. | 210/39 |
| 3,624,004 | 11/1971 | Wennerberg | 210/24 |
| 3,697,567 | 10/1972 | Taylor | 260/437 R |
| 3,755,161 | 8/1973 | Yokota et al. | 210/36 |
| 3,838,043 | 9/1974 | Crook et al. | 208/251 R |

OTHER PUBLICATIONS

Wronkowski, Chemical Abstracts, #63:14082h, 1965.
Zemskov et al., Chemical Abstracts, #56:9448f, 1962.

*Primary Examiner*—Thomas G. Wyse
*Assistant Examiner*—Ivars Cintins
*Attorney, Agent, or Firm*—Richard M. Goldman

[57] ABSTRACT

Disclosed is a method of removing ionizable organo-lead compounds from aqueous liquid compositions. The ionizable organo-lead compounds contemplated herein are those with cations having the formula;

$$(PbR_{4-x})^{+x}$$

where the R's are alkyl and aryl groups and $x$ is an integer from 0 to 3. The liquid composition typically contains from about 1 to about 20 parts per million by weight of the organo-lead compound. According to the method of this invention, the liquid composition is fed to a bed of activated carbon and passed through the bed. A liquid composition is recovered, reduced in ionizable organo-lead content, for example, an organo-lead content less than about one part per million.

8 Claims, 1 Drawing Figure

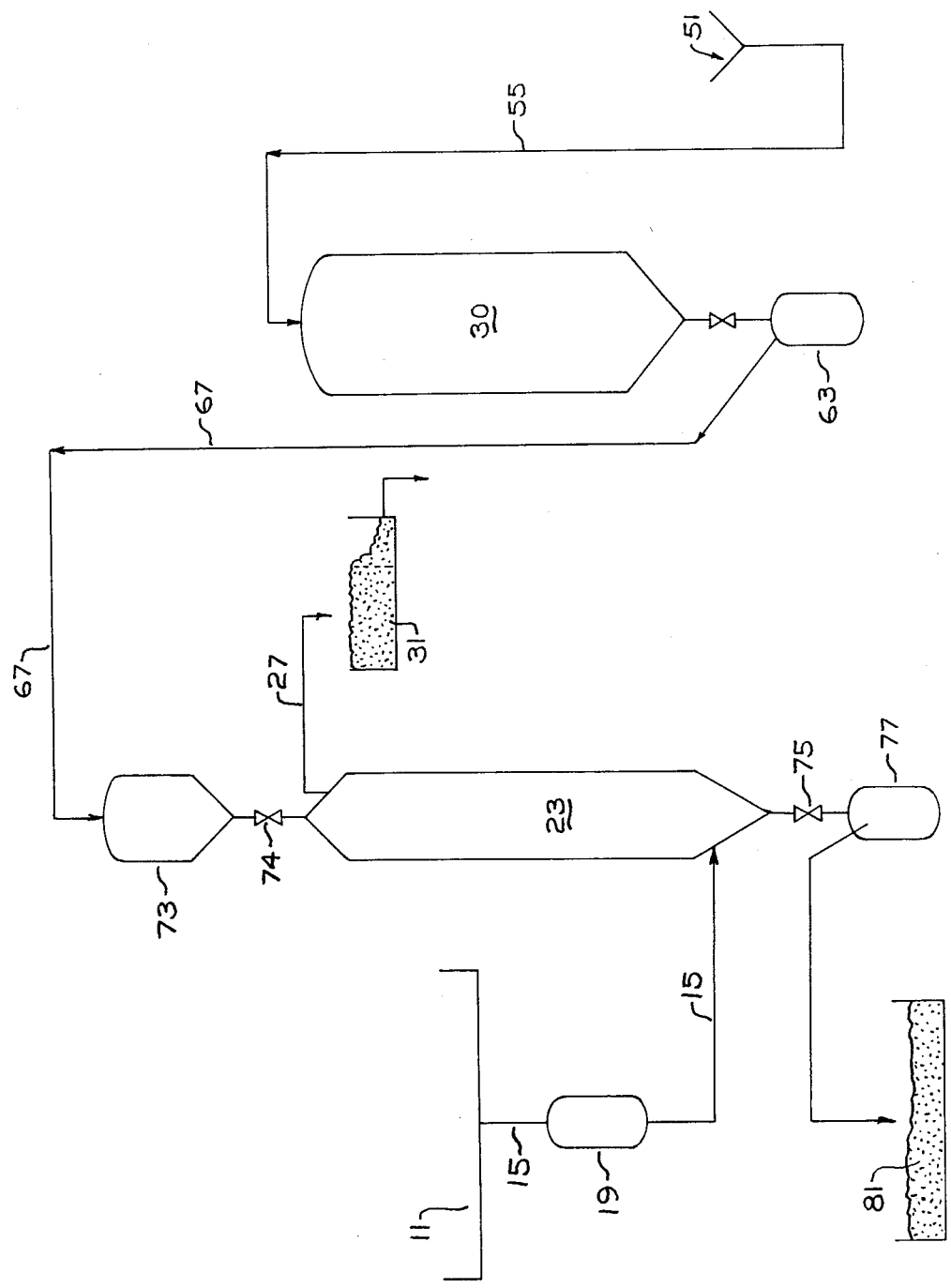

METHOD OF REMOVING DISSOLVED ORGANO-LEAD COMPOUNDS FROM WATER

CROSS REFERENCE TO RELATED APPLICATION

This is a continuation-in-part of my commonly assigned copending U.S. application Ser. No. 568,357 filed Apr. 15, 1975 for *Method of Removing Organo-Lead Compounds From Water*, now abandoned.

DESCRIPTION OF THE INVENTION

In the production of alkyl lead compounds, especially tetraethyl lead automotive anti-knock compounds, a sodium-lead alloy and ethyl chloride are reacted in an autoclave. The autoclave product includes solids, liquids, and gases, such as sodium chloride, ethane, ethyl chloride, chlorinated hydrocarbons, lead alkyl, lead alkyl complexes, and the like. The reaction product of the autoclave is fed to a steam still for separation. In the steam still, considerable quantities of water and steam are added to the feed, and the gases are separated from the liquids and solids. The solid fraction yields tetraethyl lead and other automotive anti-knock compounds. The liquid and gaseous fractions are rich in lead compounds, and the water and condensed steam contain these lead compounds.

Additionally, at various steps of the automotive anti-knock compound production process, reactants, intermediates, and products are contacted with large quantities of water. The water from the various intermediate processes as well as the products from the steam still process present a serious lead control problem. In the past, it has been the practice to collect these organo-lead containing aqueous streams, converting the organo-lead compounds to inorganic lead compounds, and physically separating the inorganic lead compounds and the suspended tetra alkyl lead compounds from the solution in a clarifier tank or settling lagoon. Typically, the feed to the clarifier tanks or settling lagoons contains about 2,000 parts per million of lead, mainly inorganic lead and tetra alkyl lead, and, after various treatments, the overflow may contain one part per million of lead, mainly dissolved, ionizable alkyl lead cations.

Inorganic lead and tetra alkyl lead can be easily removed from aqueous compositions leaving dissolved alkyl lead ions.

Inorganic lead is normally present in aqueous solution as $Pb^{+2}$. The inorganic species, however, may precipitate out of solution at moderately alkaline pH's. For example, at a pH of about pH 9 to pH 10, inorganic $Pb^{+2}$ has a minimum solubility of less than one part per million. At these alkaline pH's, the inorganic lead precipitates and can be removed by physical means, e.g., filtration or settling.

Tetra alkyl lead is relatively insoluble in aqueous solutions and even its limited solubility in aqueous solutions is relatively insensitive to pH. Tetra alkyl lead levels may be normally maintained at or below about one part per million by physical means, e.g., filtration or settling even at the alkaline pH's necessary to precipitate inorganic lead, $Pb^{+2}$.

Generally, the clarifier overflow and settling lagoon overflow at a pH of 9.0 to 10.0, and clarified, will be substantially free of inorganic lead ($Pb^{+2}$) and suspended tetra alkyl lead and will contain from about 1 to about 200 parts per million of lead and most commonly from about 1 to about 20 parts per million of lead, most frequently in the form of dissolved, ionizable organo-lead compounds.

Alkyl lead chlorides, e.g., ethyl lead trichloride, diethyl lead dichloride, triethyl lead chloride, methyl lead trichloride, dimethyl lead dichloride, and trimethyl chloride, inter alia, are present in dilute aqueous solution as the corresponding alkyl lead cation. Alkyl lead cations are soluble in aqueous solutions and their solubility is relatively insensitive to pH. Alkyl lead cations cannot be removed by filtration or by settling, regardless of pH.

Attempts to electrolytically remove the organo-lead compounds from the aqueous composition have resulted in the production of water soluble dimers and trimers of the organo-lead compounds. Attempts at removing the trace quantities of water soluble ionizable organo-lead compounds by the use of complexing agents, sequestrants, and pH control, while practical, have not proven effective in reducing the lead content below about 20 parts per million.

It has now surprisingly been found that the aqueous compositions containing dissolved organo-lead compounds, such as the overflow from clarifier ponds and settling lagoons, may be reduced in dissolved organo-lead compound content to less than one part per million by feeding the liquid composition to a bed of activated carbon, passing the liquid composition through the bed of activated carbon, and recovering the liquid composition from the bed substantially reduced in dissolved organo-lead content. Typically, the method herein contemplated is useful in reducing the dissolved organo-lead content from above about one part per million by weight, for example, from as high as about 10 or even 20 parts per million by weight, down to less than one part per million by weight, for example, as low as 0.5 part per million or even 0.1 part per million, by weight.

Particularly useful in carrying out the method of this invention is activated carbon having a porosity of from about 0.80 to about 0.85, a mean particle diameter of from about 0.45 millimeter to about 1.0 millimeter, and a mean specific area of from about 900 to about 1,200 square meters per gram.

DESCRIPTION OF THE FIGURE

The FIGURE shows a flow chart of one exemplification of the method of this invention. As there shown, a liquid aqueous composition may be withdrawn from the settling lagoon 11 through feed line 15 to filter 19. From the filter, the filtered solution passes to a packed tower 23 and out of the packed tower 23 through outlet 27 to a treated water sump 31.

Carbon is added to the system through carbon hopper 51 from where it is conveyed through line 55, with water, to a carbon storage tank 30. From the carbon storage tank 30, the carbon is fed to a motive tank 63 and then through a carbon charge tank line 67 to a carbon charge tank 73. From the carbon charge tank 73 the carbon is introduced into the packed bed 23 as will be described more fully hereinafter. The lead-containing carbon is periodically removed from the packed carbon bed 23 through a spent carbon blow case 77 to spent carbon storage 81 where it is collected for subsequent recovery of the lead.

DETAILED DESCRIPTION OF THE INVENTION

According to this invention, trace quantities of dissolved organolead compounds, i.e., ionizable organolead compounds, are removed from aqueous compositions by passing the aqueous composition through a packed activated carbon bed, thereby recovering an aqueous composition substantially diminished in dissolved, ionizable organo-lead content.

The water soluble, organo-lead compounds normally recovered by this process are ionizable salts having the formula;

$$PbR_{4-x}Y_x$$

which may alternatively be referred to as cations of ionizable organo-lead (+4) compounds, which cations have the formula;

$$(PbR_{4-x})^{+x}$$

where R is an alkyl or aryl group having from 1 to 8 carbon atoms, and most frequently an alkyl group having from 1 to 3 carbon atoms, and $x$ is a number from 1 to 3, and most commonly 1 or 2. Most commonly, R is a methyl group, $CH_3$, or an ethyl group, $CH_2CH_3$, although it may be a propyl group, a butyl group, a pentyl group, a hexyl group, an octyl group, or an aryl group. Y is an anionic species, usually chlorine.

The most common water soluble organo-lead compounds produced as by-products of the lead alkyl automotive anti-knock compound production process, are triethyl lead chloride, diethyl lead dichloride, ethyl lead trichloride, trimethyl lead chloride, dimethyl lead dichloride, and methyl lead trichloride. Most commonly, the principal water soluble organo-lead compound is triethyl lead chloride. Additionally, tetraethyl lead may be dispersed in the liquid composition. Such tetraethyl lead is removable by filtration. Whenever triethyl lead chloride is referred to herein, it will be understood to include the other dispersed compounds and water soluble organo-lead compounds normally present therewith. Generally, the dissolved, ionizable organo-lead compounds are alkyl lead compounds, and the invention will be described with especial reference thereto. However, unless the contrary appears from the context, ionizable aryl lead salts are also intended thereby.

The dissolved, ionizable organo-lead compounds are most frequently present at trace levels, well below the solubility limits of even relatively insoluble tetra alkyl lead compounds and inorganic lead compounds. While the dissolved organo-lead compounds are referred to as being water soluble, they may, in fact, be only water soluble at the trace levels herein contemplated. For example, the overflow from clarifier ponds and settling lagoons contains less than about 2,000 parts per million of ionizable alkyl lead compounds, and typically less than about 200 parts per million of the ionizable alkyl lead compounds, and frequently less than about 100 parts per million of ionizable alkyl lead compounds. Most frequently, the overflow from clarifier ponds and settling lagoons contains from about 1 to about 20 parts per million of ionizable alkyl lead compounds, e.g., alkyl lead chlorides. Additionally, the overflow from clarifier ponds and settling lagoons contains about 20 grams per liter of chlorine as chlorides or hypochlorides, including sodium as sodium chloride and hypochloride, and small amounts of aluminum and chromium, for example, at the 10 to 15 parts per million level. This stream is passed through the activated carbon bed.

According to the method of this invention, an aqueous liquid composition containing inorganic lead compounds, e.g., $Pb^{+2}$ compounds, tetra alkyl lead, e.g., tetraethyl lead or tetramethyl lead, and dissolved, ionizable organo-lead compounds, e.g., alkyl lead compounds such as triethyl lead chloride, diethyl lead dichloride, ethyl lead trichloride, trimethyl lead chloride, dimethyl lead dichloride, and methyl lead trichloride, inter alia, are adjusted to a pH of between pH = 9.0 and pH = 10.0 whereby to precipitate the inorganic lead ($Pb^{+2}$). Thereafter, the precipitated inorganic lead ($Pb^{+2}$) and the suspended tetra alkyl lead are physically separated from the aqueous liquid composition, for example, by settling, filtration, or sedimentation. The liquid composition, substantially free of inorganic lead ($Pb^{+2}$) and tetra alkyl lead and containing dissolved, ionizable alkyl lead compounds is passed through a bed of activated carbon thereby removing ionizable alkyl lead compounds from the liquid composition.

Typically, the aqueous composition contains in excess of 2,000 parts per million of total lead compounds before precipitation of the inorganic lead and physical separation of the inorganic lead and the suspended tetra alkyl lead. After physical separation of the precipitated inorganic lead and the suspended tetra lead and before treatment with activated carbon, the liquid composition contains from about 1 to about 200 parts per million of lead, and most frequently from about 1 to about 20 parts per million lead, generally as the dissolved, ionizable alkyl lead salts.

According to the method of this invention, a liquid composition containing water soluble organo-lead compounds, i.e., organo-lead cations, is fed to and passed through a bed of activated carbon, and a liquid composition substantially reduced in water soluble organo-lead compounds is recovered therefrom. The reduction in organo-lead content is a function of the flow rate per unit of bed area parallel to the direction of flow, the physical properties of the carbon particles, the length of the bed, the pH of the aqueous composition, and the temperature of the aqueous composition.

The feed to the activated carbon bed contains more than about one part per million, up to about 10 or even 20 parts per million of water soluble, organo-lead compounds, and most frequently from about 2 to about 10 parts per million of water soluble organo-lead compounds. The product recovered from the packed bed may, under favorable circumstances, contain as low as 0.1 parts per million of the water soluble organo-lead compounds, for example, in the case of a dilute feed stream containing from about 2 to about 5 parts per million of organo-lead compounds. Or, the liquid product recovered from the packed bed may contain as high as one part per million of organo-lead compounds, for example, in the case of a concentrated feed. Generally, the product recovered from the packed bed will contain from about 0.3 to about 0.8 parts per million of water soluble organo-lead compounds, by weight, and preferably from about 0.3 to about 0.5 parts per million of water soluble organo-lead compounds by weight.

The reduction in water soluble organo-lead compounds is generally on the order of from about 1.6 parts per million, by weight, to about 10 parts per million, by weight, at the flow rates, bed heights, particle geometry, temperatures, and pH herein contemplated.

The liquid composition may either be passed upwardly through the bed or downwardly through the bed. Preferably, the liquid composition is passed upwardly through the bed. It has been found that a slightly smaller bed height is required for a given amount of organo-lead removal at a constant mass flow rate per unit area if the flow is upward through the bed rather than downward through the bed. However, the flow may also be downward if a slightly longer packed bed is used.

The diminution of organo-lead compound is a function of the velocity through the bed. Most commonly, the velocity is expressed in terms of mass per time per unit area perpendicular to the direction of flow. The mass flow rate must be high enough to get satisfactory contact between the aqueous liquid composition and the activated carbon, but low enough to provide a satisfactory residence time within the packed bed. Preferably, the flow rate is low enough when the flow is upward through the bed to avoid fluidizing the bed. This is because it is more economical to replace some of the carbon in the bed at frequent intervals than to less frequently replace all the carbon in the bed as will be described more fully hereinafter. Additionally, when the bed becomes fluidized, lead-containing carbon fines may pass out with the treated liquid. Accordingly, the flow rate should be adjusted to a low enough level to avoid any substantial amount of fluidization. Preferably, the flow rate expressed as mass per unit time per unit area is from about 3 to about 10 gallons per minute per square foot and preferably from about 3.5 to about 8.5 gallons per square foot per minute. However, the method of this invention may be used with fluidized bed operation.

The flow rates herein contemplated provide a residence time of from about 6 to about 50 minutes in a packed bed having a height of from about 9 to about 15 feed as will be described more fully hereinafter. Preferably, the residence time is from about 10 to about 40 minutes with about 12 to about 30 minutes being especially satisfactory. Residence times of less than about 6 minutes while useful in reducing the lead content, only provide a minimal reduction. Residence times of greater than about 50 minutes provide no substantial additional diminution of the organo-lead content of the liquid composition. When the term "residence time" is used herein, it refers to the volume of the bed where adsorption is taking place, e.g., the first 10 to 15 feet of the bed as will be described more fully hereinafter, divided by the flow rate therethrough.

The geometry of the packed bed may either be vertical or horizontal. A vertical geometry having vertical feed is preferred because of better distribution of the liquid composition. The height of the beds should be sufficient to provide a residence time to reduce the water soluble, organo-lead content to the desired extent as described more fully hereinbefore.

Generally, at the flow rates herein contemplated, e.g., from about 2 to about 10 gallons per minute per square foot of bed area perpendicular to the direction of flow, most of the adsorption of the organo-lead compound into the activated carbon takes place in the first 9 to 12 feet of bed height contacted by the liquid composition. The height will generally vary with the amount of lead in the aqueous composition. Furthermore, as the equilibrium lead content of the carbon is reached near the inlet, the 9 to 15 foot zone where adsorption is actually occurring will advance upward through the bed. That is, the bottom region adsorbed lead is in equilibrium with the lead in the feed liquid composition so that substantially little, if any, organo-lead compound is adsorbed on the carbon. This region of no additional adsorption grows upward, while the region where adsorption is occurring remains at constant height but gradually moves upward through the bed, and the substantially lead-free region above gradually diminishes in height. As will be described more fully hereinafter, a carbon bed height of at least 9 to 15 feet is required, with the carbon being replaced semi-continuously. That is, carbon containing a high amount of lead is removed from the packed bed while substantially lead-free carbon is fed in at the top of the bed. Generally, the bed is higher than about 9 to 15 feet in order to allow a reasonable time between the removal of layers of used carbon and feed of layers of fresh carbon.

The diameter of the packed bed, that is, the area perpendicular to the direction of flow, is sufficient to allow the desired throughput, mass per unit time, while maintaining the velocity, the mass per unit time per area, with a satisfactory range for mass transfer.

Preferably, the feed to the packed bed is filtered to remove suspended solids, that is, solids having an effective particle diameter greater than about 10 microns. This may be done by conventional filtering operations such as filter paper, filter presses, sand, gravel, or the like.

The activated carbon is typically in the form of small particles, for example, 100 percent passing 8 mesh and substantially none passing 40 mesh, and preferably 100 percent passing 8 mesh and substantially none passing 30 mesh. The specific surface area of the activated carbon useful in the method of this invention typically is at least about 800 square meters per gram, as much as 1,000 or 1,200 square meters per gram, and most frequently from about 850 to about 1,000 square meters per gram. The iodine number of the activated carbon, a measure of the total specific area, is typically from about 800 to about 1,100, preferably above about 850, and most frequently below about 1,000, and generally in the range of from about 850 to about 1,000. The molasses number is a measure of the large pores, i.e., the pores greater than about 28 angstroms, is generally in the range of from about 200 to about 260 and most frequently in the range of from about 210 to about 250. The mean particle diameter is generally from about 0.40 millimeter to about 1.0 millimeter and generally in the range of from about 0.5 millimeter to about 0.9 millimeter. The porosity of the packed bed is generally in the range of from about 0.8 to about 0.85.

As described hereinabove, the activated carbon adsorbs lead from the aqueous liquid composition until the lead adsorbed on the surface of the activated carbon is substantially in equilibrium with the lead in the solution entering the packed bed. This is referred to as an equilibrium amount of lead. At this point no further lead can be adsorbed, and if the aqueous solution should upset in the direction of a slightly diminished organo-lead content some lead may be desorbed from the surface of the activated carbon. Typically, the carbon which contains an equilibrium amount of lead adsorbed on the surface thereof, is only a layer or segment or zone near the inlet of the packed bed 23. However, as described hereinbefore, this zone of activated carbon containing an equilibrium amount of lead adsorbed thereon grows into the bed from the inlet towards the outlet with time. According to this invention, the carbon, with an equilibrium amount of lead adsorbed on the surface, must be removed and replaced with fresh carbon. According to a preferred exemplification of this invention, this is done by pulsing the carbon, as will be described more fully hereinafter.

The fresh carbon of enhanced lead adsorbing capability is carbon containing a small enough amount of adsorbed lead that is can readily adsorb additional lead. Such carbon contains less than about 1.4 weight percent adsorbed lead on the surface thereof. Preferably, it contains less than about 0.1 weight percent lead adsorbed on the surface thereof and is may in fact contain no measurable amount of lead. Such fresh activated carbon of enhanced lead absorbing capability with respect to the used activated carbon is referred to herein as being substantially lead-free carbon.

The used carbon, i.e., carbon of diminished lead adsorbing capability, is carbon containing lead at substantially the amount of lead that is in equilibrium with the lead in the liquid aqueous composition fed to the carbon bed 23. Generally, the used carbon will contain more than about 2 weight percent lead adsorbed on the surface thereof although it may contain as little as 1.4 weight percent lead on the surface thereof or even as much as 2.8 or even 3.0 weight percent lead adsorbed on the surface thereof.

Preferably, the used carbon is withdrawn from the bed and replaced with fresh carbon by pulsing the bed. That is, the flow of the feed aqueous liquid composition with a small amount of soluble organo-lead compounds therein is stopped. Simultaneously, fresh activated carbon is fed into the packed bed 23 from the carbon charge tank 73 and an equivalent amount of used activated carbon with diminished lead adsorbing capability, i.e., containing a substantially equilibrium concentration of adsorbed lead on the surface thereof, is withdrawn from the packed bed 23 through spent carbon blow case 77.

Pulsing may be understood by reference to the appended FIGURE wherein there is shown a flow chart of a preferred method of this invention. As there shown, the fresh carbon is fed to the bed 23 and the used carbon is withdrawn from the bed 23 simultaneously. The carbon goes from bulk storage, not shown, into the carbon hopper 51. The activated carbon may be water wetted in the carbon hopper 51 to improve the flow characteristics thereof. Thereafter, the carbon is carried from the hopper 51 through a line 55 to the wet carbon storage 30. From the wet carbon storage 30, the wet carbon is transported to the blow case 63 where motive water is added. The wet carbon, propelled by motive water, is then fed from the blow case 63 through a line 67 to the charge tank 73. Then, at the appropriate time, the carbon is fed from the charge tank 73 to the adsorber 23.

Simultaneously with the feed of fresh carbon to the bed, the used carbon is discharged from the adsorber 23. The discharge of the carbon is controlled by valve 75 and the carbon passes to the blow case 77 and from the blow case 77 to the spent carbon storage 81. The carbon, containing in excess of about 1 weight percent lead adsorbed on the surface thereof, in the form of organo-lead compounds, and frequently as much as 2.8 percent lead adsorbed on the surface thereof, may then be collected and the lead recovered therefrom, for example, by chemical recovery or thermal recovery.

In carrying out the method of this invention, the carbon may be carried from hopper 51 to storage 30 continuously, semi-continuously, intermittently, or upon demand. Generally, the carbon is transported from the hopper 51 to storage unit 30 in an intermittent method related to the demand. The carbon is then carried from the storage unit 30 to the blow case 63 continuously, semi-continuously, by demand, or intermittently, and most frequently on an intermittent basis related to demand. The carbon is then charged from blow case 63 to charge tank 73.

Valve 74 between the charge tank 73 and the bed 23 and valve 75 between the bed 23 and the spent carbon blow case 77 are preferably opened substantially simultaneously, e.g., within several seconds of each other. In this way, fresh carbon comes into the bed 23 under the influence of gravity while used carbon falls out of the bed 23 under the influence of gravity.

The following examples are illustrative of the method of this invention.

EXAMPLE I

Three tests were conducted passing a liquid composition through an activated carbon packed bed.

In each run the liquid composition was first passed through a sand filter at a volume velocity of about 1.5 gallons per minute. Thereafter, it was passed to a carbon adsorber having a lined steel body 6 inches in diameter and 13 feet high with a 3 cubic foot working capacity. The carbon adsorber was maintained at atmospheric pressure and the effluent liquid composition, diminished in organo-lead content, was recovered in a treated water sump.

The carbon bed was packed with Calgon Filtersorb 400 brand activated carbon. Calgon Filtersorb 400 activated carbon is 12 × 40 mesh, has a specific surface area of 1,100 to 1,200 square meters per gram, an iodine number of about 1,000, a molasses number of about 250, a porosity of about 0.85, and a mean particle diameter of about 0.50 millimeters.

The carbon was maintained in the carbon storage tank at atmospheric pressure and was intermittently fed into the carbon blow case at a temperature of 50 lbs. per square inch and from there at a flow rate of about 75 gallons per minute to a charge tank. The carbon charge tank was maintained at atmospheric pressure.

The intermittent discharge of carbon was fed into a spent carbon blow case with 25 lbs. per square inch capacity and a volume of 300 cubic feet. From the blow case the carbon was carried by motive air to a spent carbon pit where the carbon was stored until the lead could be recovered therefrom.

RUN NO. 1

A test was carried out where the mass velocity of liquid composition to the packed bed was 7.4 gallons per minute per square foot of bed cross section. The feed contained six parts per million of organo-lead compounds, mainly diethyl lead dichloride, triethyl lead chloride, triethyl lead chloride, methyl lead trichloride, dimethyl lead dichloride, and trimethyl lead chloride. The liquid was passed upward through the carbon bed and a product was recovered containing 0.4 parts per million of organo-lead compounds.

The pressure across the bed increased by 5 lbs. per square inch per day. When the pressure across the bed had increased by 10 lbs. per square inch, the feed of liquid was halted. Thereafter, 0.3 cubic foot of carbon was passed from the charge tank to the carbon bed while simultaneously 0.3 cubic foot of spent carbon was withdrawn from the bottom of the bed to the spent carbon blow case and from there to the spent carbon pit for storage until lead recovery could be undertaken.

RUN NO. 2

A continuation of Run No. 1 was carried out.

The feed rate of the aqueous liquid composition was 7.4 gallons per minute per square foot of bed cross section. Prior to being introduced into the adsorber, the liquid composition had been filtered through 10 micron Filterite (TM) cartridge. The feed to the adsorber contained 2.5 parts per million organo-lead compounds enumerated in Run 1. The liquid composition was passed upward through the bed and a product containing 0.6 parts per million of the organo-lead compounds was recovered from the adsorber.

The pressure increase was 2 lbs. per square inch per day. When the pressure increase had exceeded 10 lbs. per square inch, the flow of liquid composition was halted and 0.14 cubic foot of carbon was passed from the charge tank into the adsorber bed while simultaneously 0.14 cubic foot of spent carbon was recovered from the bottom of the bed. The used carbon went to the spent carbon blow case and from there to the spent carbon pit for storage until the lead could be removed therefrom.

RUN NO. 3

Another run was undertaken where the liquid composition was filtered through a sand bed. The feed rate was 7.4 gallons per minute per square foot of bed cross section, and the pond effluent was filtered through a 22 inch bed of 0.45 to 0.55 millimeter sand. There were 7.2 parts per million of the organo-lead compounds, enumerated in Run 1, in the feed liquid composition. The liquid composition was passed upward through the activated carbon bed adsorber and a product was recovered containing 0.8 parts per million of the organo-lead compounds in the effluent. There was only a very slight increase in pressure drop across the bed. However, after 10 days of operation and again after 20 days of operation, the feed of liquid composition to the bed was shut down, and approximately 0.5 cubic foot of carbon was added to the top of the carbon bed while approximately 0.5 cubic foot of carbon was simultaneously withdrawn from the bottom of the bed. This used carbon went to the spent carbon blow case and from there to the spent carbon pit for storage until the lead could be removed therefrom.

EXAMPLE II

A series of tests were conducted with clarifier pond overflow to determine the lead compounds removed by activated carbon.

The clarifier pond overflow contained 14 parts per million dissolved alkyl lead cations, mainly ethyl lead trichloride, diethyl lead dichloride, triethyl lead chloride, methyl lead trichloride, dimethyl lead dichloride, and trimethyl lead chloride. A sample of the clarifier pond overflow was divided into two aliquot portions. Twenty-two parts per million of tetra ethyl lead were added to one portion. Twelve parts per million of triethyl lead cation, as triethyl lead acetate, were added to the second portion. The two portions were then agitated for one hour.

Each of the above portions was further divided into two aliquot portions; 63 grams per liter of Pittsburgh CAL(TM) brand activated carbon were than added to one of the tetra ethyl lead portions and to one of the triethyl lead acetate portions. Each of these samples to which the carbon had been added was agitated for 18 hours and then filtered. The liquid recovered contained about one part per million of lead in both cases. The carbon removed both the suspended tetraethyl lead and the dissolved alkyl lead cations.

The two portions to which no carbon had been added were agitated for 18 hours and then filtered. The liquid recovered from the solution to which tetra ethyl lead had been added contained 14 parts per million dissolved lead, all of the suspended tetra ethyl lead having been removed by filtration. The liquid recovered from the solution to which triethyl lead acetate had been added contained 24 parts per million dissolved lead. The suspended tetra ethyl lead was removed by filtration alone while substantially none of the dissolved alkyl lead cation was removed by filtration alone.

The results are summarized in Table I below.

Table I

|  | Tetra ethyl lead test | | Triethyl lead acetate test | |
| --- | --- | --- | --- | --- |
| Initial concentration of dissolved lead | 14 ppm | 14 ppm | 14 ppm | 14 ppm |
| Tetra ethyl lead added | 22 ppm | 22 ppm | — | — |
| Triethyl lead acetate added | — | — | 12 ppm | 12 ppm |
| Total alkyl lead cation | 14 ppm | 14 ppm | 26 ppm | 26 ppm |
| Total lead | 36 ppm | 36 ppm | 26 ppm | 26 ppm |
| Carbon added | 63 g/L | — | 63 g/L | — |
| Final lead concentration | 1 ppm | 14 ppm | 1 ppm | 24 ppm |
| Total lead removal | 35 ppm[1] | 22 ppm[2] | 25 ppm[3] | 2 ppm[4] |

[1]Dissolved lead and suspended lead removed.
[2]Only suspended lead removed.
[3]Only dissolved lead present and only dissolved lead removed.
[4]No removal within experimental error.

Although the present invention has been described with reference to specific details or particular embodiments thereof, it is not intended thereby to limit the scope of the invention except insofar as specific details are recited in the appended claims.

I claim:

1. A method of removing water soluble organo-lead salts chosen from the group having cations consisting of $(PbR_3)^{+1}$, $(PbR_2)^{+2}$, $(PbR)^{+3}$, and mixtures thereof, where R is chosen from the group consisting of aryl groups and alkyl groups having from 1 to 8 carbon atoms from an aqueous liquid composition containing more than 1 part per million of said salts comprising:

passing the aqueous composition through a packed bed of activated carbon;

adsorbing the organo-lead salts onto the activated carbon; and recovering the aqueous liquid composition, reduced in organo-lead content to less than 1 part per million of the organo-lead salts, from the packed bed.

2. The method of claim 1 wherein the liquid composition fed to the activated carbon bed contains from about 1 to about 20 parts per million, by weight, of organo-lead salts.

3. The method of claim 1 comprising passing the liquid composition upward through the activated carbon bed.

4. The method of claim 1 wherein the activated carbon has a means specific area of from about 800 to about 1,200 square meters per gram and a mean particle diameter of from about 0.40 to about 1.0 millimeter.

5. The method of claim 1 comprising:
stopping the flow of the liquid composition;
simultaneously feeding fresh activated carbon of enhanced lead adsorbing capability to the bed and withdrawing used activated carbon of diminished lead adsorbing capacity from the bed by gravity flow; and
thereafter resuming the flow of liquid composition to the bed.

6. The method of claim 5 comprising feeding liquid composition to the bed until the activated carbon first in contact with the liquid composition attains a lead content of greater than 1.0 weight percent of lead, stopping the flow of liquid composition to the bed, and simultaneously starting feed of fresh carbon to the bed and withdrawal of used activated carbon from the bed.

7. A method of removing dissolved water soluble organo-lead compounds chosen from the group consisting of triethyl lead chloride, diethyl lead dichloride, ethyl lead dichloride, trimethyl lead chloride, dimethyl lead dichloride, methyl lead dichloride, and mixtures thereof, from an aqueous liquid composition substantially free of inorganic lead compounds and tetra alkyl lead compounds and containing from about 1 to about 20 parts per million of the water soluble organo-lead compounds, which method comprises:
passing the aqueous liquid composition through a packed bed of activated carbon;
adsorbing the organo-lead compounds onto the activated carbon; and
recovering the aqueous liquid composition, reduced in organo-lead content to less than 1 part per million, from the packed bed.

8. A method of treating a lead-containing aqueous composition containing inorganic lead compounds, tetra alkyl lead, and more than 1 part per million of dissolved ionizable organo-lead compounds, which method comprises:
adjusting the pH of the liquid composition to between pH = 9.0 and pH = 10.0 whereby to precipitate the inorganic lead compounds;
physically separating inorganic lead compounds and tetra alkyl lead compounds from the liquid composition;
passing the liquid composition containing more than 1 part per million of dissolved ionizable organo-lead compounds through a bed of activated carbon whereby to adsorb the organo-lead compounds onto the activated carbon, thereby removing dissolved, ionizable organo-lead compounds from the liquid composition; and
recovering a liquid composition containing less than 1 part per million of ionizable organo-lead compounds from the activated carbon bed.

* * * * *

UNITED STATES PATENT AND TRADEMARK OFFICE
CERTIFICATE OF CORRECTION

PATENT NO. : 4,070,282
DATED : January 24, 1978
INVENTOR(S) : Jack M. Otto

It is certified that error appears in the above–identified patent and that said Letters Patent are hereby corrected as shown below:

Column 10, line 60, after "aqueous" insert --liquid--.

*Signed and Sealed this*

*Twenty-third* Day of *May 1978*

[SEAL]

Attest:

RUTH C. MASON
*Attesting Officer*

LUTRELLE F. PARKER
*Acting Commissioner of Patents and Trademarks*